Figure 1:
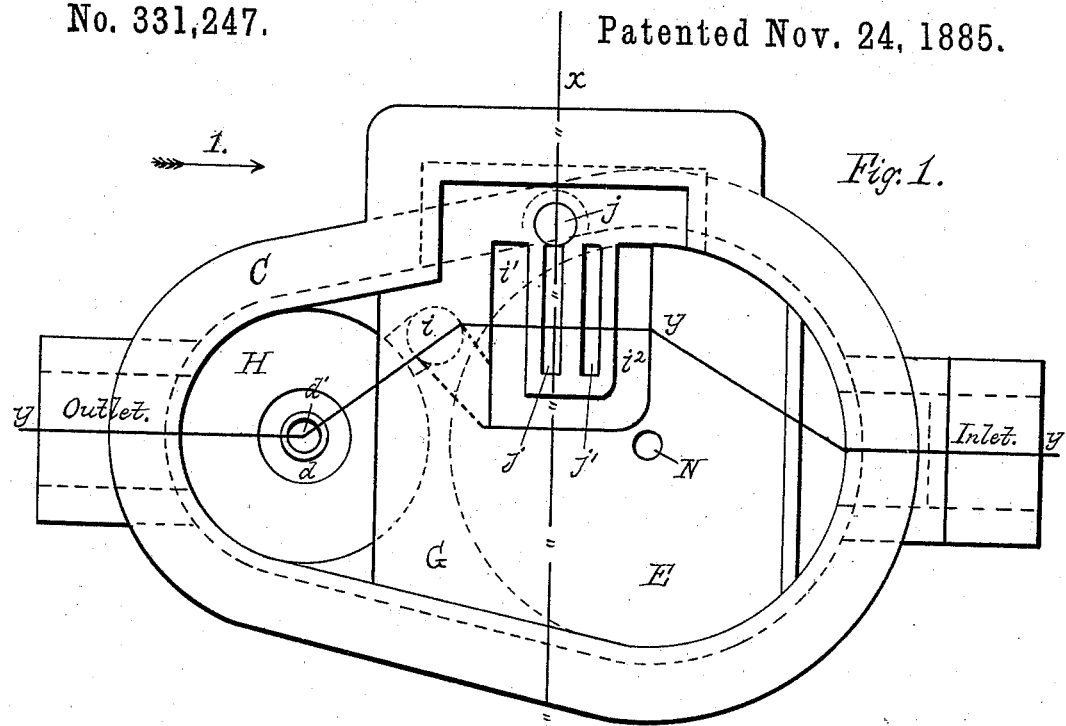

(No Model.)　　　　　　　　　　　　　　　　　　2 Sheets—Sheet 1.
L. W. LOMBARD.
DIFFERENTIAL PISTON METER.

No. 331,247.　　　　　　　　　　　Patented Nov. 24, 1885.

Witnesses.　　　　　　Inventor.
H. E. Lodge　　　　　　Levi W. Lombard.
A. F. Hayden.　　　　　　F. Curtis, Atty.

(No Model.) 2 Sheets—Sheet 2.
L. W. LOMBARD.
DIFFERENTIAL PISTON METER.
No. 331,247. Patented Nov. 24, 1885.
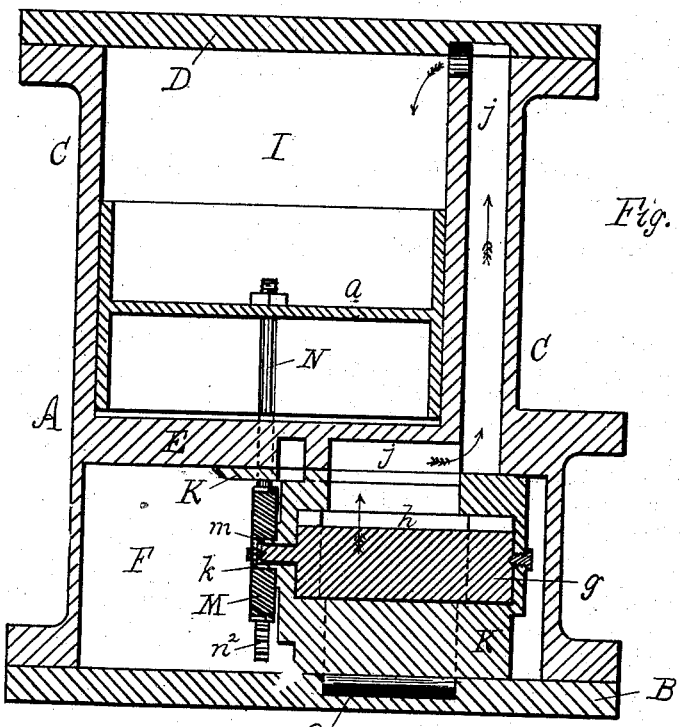
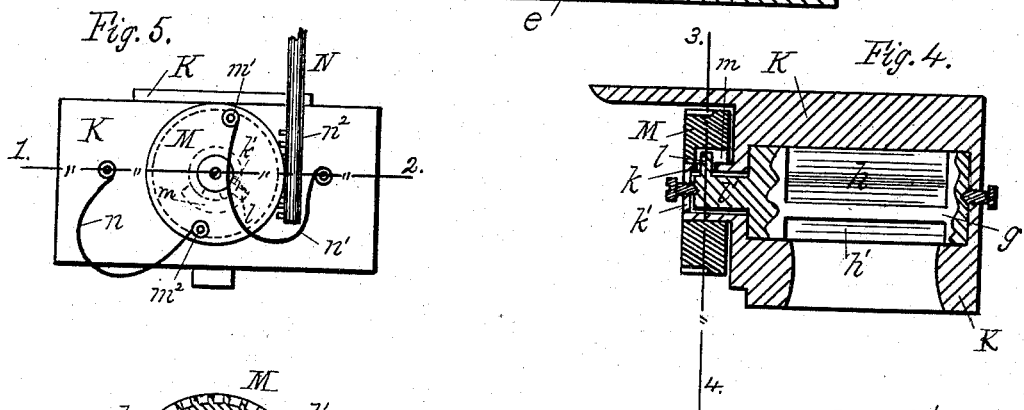
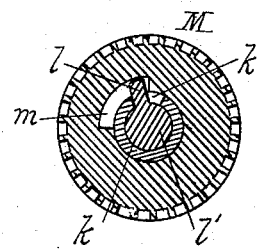
Witnesses.
H. E. Lodge
A. F. Hayden.
Inventor.
Levi W. Lombard.
F. Curtis. atty.

UNITED STATES PATENT OFFICE.

LEVI WILLIAM LOMBARD, OF BOSTON, MASSACHUSETTS, ASSIGNOR, BY MESNE ASSIGNMENTS, TO THE LANG HYDRAULIC MACHINE COMPANY, OF PORTLAND, MAINE.

DIFFERENTIAL-PISTON METER.

SPECIFICATION forming part of Letters Patent No. 331,247, dated November 24, 1885.

Application filed December 4, 1884. Serial No. 149,467. (No model.)

*To all whom it may concern:*

Be it known that I, LEVI WILLIAM LOMBARD, a citizen of the United States, residing at Boston, in the county of Suffolk and State of Massachusetts, have invented certain new and useful Improvements in Fluid-Meters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of instruments for measuring fluids in which the quantity delivered bears a certain ratio to that measured, whereby the entire amount is easily ascertained.

My improvements relate, especially, to the general construction and arrangement of the various chambers and operative parts relatively to each other; and it consists, first, in constructing a differential-valve meter with three chambers, the supply-chamber connecting with the street-main, the discharge-chamber communicating with a pipe leading to the house, and the measuring-chamber with its reciprocating piston or equivalent; secondly, in the disposal of the differential delivery and measuring valves located within the supply-chamber, but with the port from the measuring-valve leading to the measuring-chamber to permit the liquid to drive, by means of an intermediary valve, a piston, while the liquid from said chamber passes along and joins with the water in the discharge-chamber, in lieu of being run through a pipe leading to the atmosphere without its return to the house-supply, as adopted in a certain patented meter of this class; thirdly, in weighting the delivery and measuring valves sufficiently to superinduce and maintain a greater pressure within the supply-chamber and the active portion of the measuring-chamber than exists in the discharge-chamber and the inactive or exhaust portion of said measuring-chamber, whereby motive power is obtained to drive the piston; fourthly, in the general construction of the operative parts to drive the piston, and means to vary the amount of liquid passing to the same, by which the proper differential supply is admitted to said measuring-chamber and the dial-hand or index-pointer operated by said piston shall register in a unit of time the same amount as that delivered by the apparatus in the same unit of time; fifthly, in permitting the liquid which passes through the measuring-chamber to enter said chamber by means of an intermediary valve, to be hereinafter described, with a pressure due to the supply-chamber, while the liquid in the other part of said measuring-chamber is not affected by said pressure, but only by that due to the discharge-chamber; hence the liquid passing through the smaller or measuring valve enters the discharge-chamber without interference, being in fact aided by the movement of the piston, which is actuated by the greater pressure from the supply-chamber.

Figure 2:
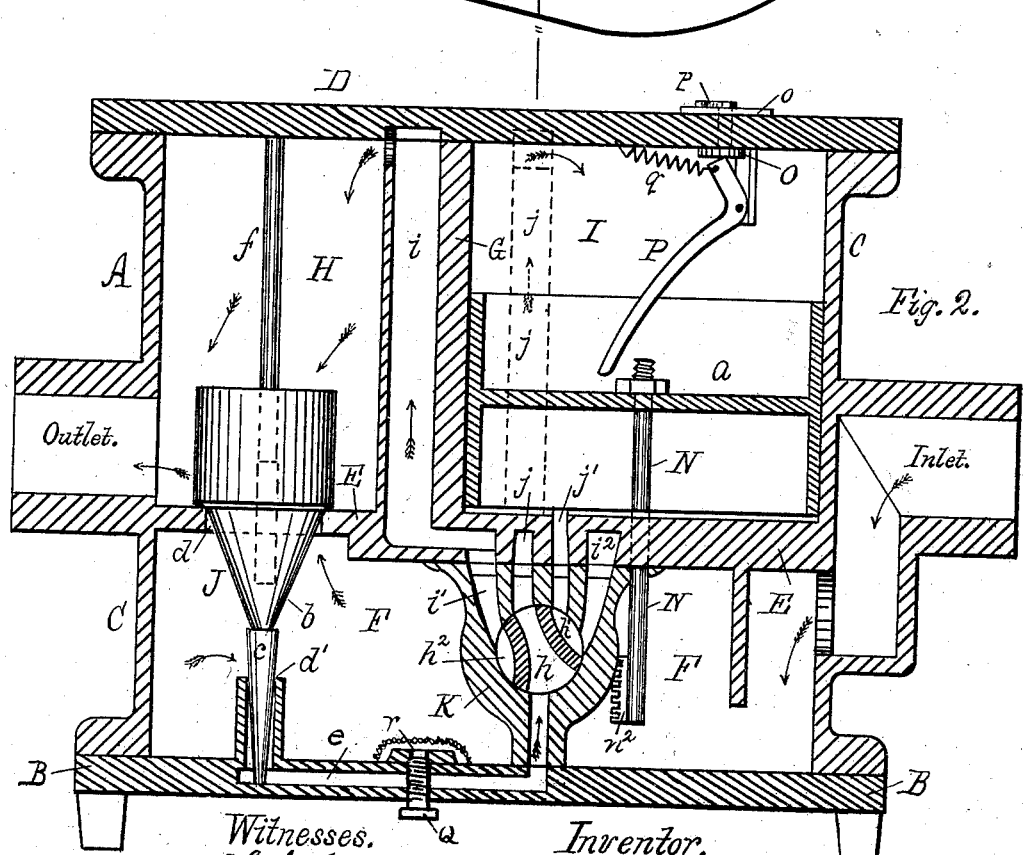

The drawings accompanying this specification represent, in Figure 1, a plan of the under side of the meter with the intermediary valve, with its casing and the bottom plate of said meter removed. Fig. 2 is a vertical cross-section on plane $y$ $y$ of Fig. 1, showing a measuring apparatus embodying my invention. Fig. 3 is a vertical transverse section on line $x$ $x$, looking in the direction of arrow 1, with the meter in an upright position. Fig. 4 is an enlarged longitudinal section of the intermediary valve to be described, while Fig. 5 is an end view of part of its operative mechanism. Fig. 6 is an enlarged cross-section on line 3 4, and Fig. 7 is a side elevation of the spring-actuated pinion.

In the drawings, A represents the shell of the meter-formed of the bottom B, sides C C, and removable cap D, and further provided with inlet and outlet passages. The interior portion of said shell is horizontally divided by the partition E, forming the supply-chamber F, communicating with the water-supply or street-main, while the upper part, by means of the division-wall G, is subdivided and forms two circular chambers, one the discharge-chamber H, leading to the house, and the other a measuring-chamber, I, in which reciprocates a piston, $a$, to be driven by the liquid which passes through the measuring-valve, said liquid always being a proportional part of the quantity delivered.

In order to measure the water proportionally—the essential feature in apparatus of this class—I have disposed a vertically-operating differential compound valve, J, in shape an inverted cone, but with different tapers $b\ c$. The upper cone, $b$, when at rest, is seated in the partition E, and forms the delivery-valve, with its port at $d$. The lower cone, $c$, when in a like position, snugly fits a short post erected upon the bottom B of the meter, and forms the measuring-valve, with its port at $d'$, while the apex of said cone rests upon the metal forming the passage or duct $e$, leading to the measuring-chamber I. To support this compound valve and permit of free vertical movement consequent upon the demand of water in the house or other building, I have disposed a guide-post, $f$, upon the cap D. This post maintains the valve J in proper position, and insures its closing upon the seats $d\ d'$.

In order to actuate the piston $a$ reciprocally, and thereby measure a proportional quantity of the entire supply of water passing through the meter, I have constructed a valve-case, K, containing a semi-rotary or oscillating spring-actuated valve, $g$, the movement of this valve being due to the stroke of the piston $a$ traveling within the measuring-chamber I, and driven by the pressure of the supply-chamber F, increased by the weighted compound differential valve J. The weight of this valve superinducing the pressure from the supply or main chamber sufficiently to always overcome the inertia and friction of the piston $a$, so that in case the discharge and supply pressures are almost equal, there shall always be a preponderance in favor of the supply; otherwise there would be no power wherewith to drive the piston and render the apparatus operative. The operative parts of the valve $g$ consist of the inlet-passage $h$, communicating with the inlet-passages $j\ j'$, and the exhaust-passages $h'\ h^2$, which co-operate with the exhaust-passages or ports $i'\ i^2$, the passage $j'$ leading directly to the under side of the piston, while the passage $j$ is extended upward through the partition G, and delivers water upon the top side of the said piston. The main discharge-passage $i$ is common to the two ducts $i'\ i^2$, and by means of it they deliver the exhaust liquid into the discharge-chamber H. This intermediary valve $g$ is centrally pivoted at one end, and adjustable thereat, while the other end is similarly mounted, and moves in a tubular hub, $k$, provided with a slot, $k'$, in which a pin, $l$, mounted in the journal $l'$ of the valve $g$, is operated by the rapid and partial rotations of the pinion or gear M, provided with the sectoral notch $m$, and turning loosely upon hub $k$. The exterior face of this pinion is further provided with diametrically-arranged studs $m'\ m^2$, actuated by springs $n\ n'$, while a rack, $n^2$, meshing with the pinion, is attached to the end of the connecting-rod N. This latter is centrally attached to and actuated by the piston $a$, and is capable of adjustment by means of a suitable nut. This adjustment in the length of the rod N is to bring the rack in proper relation to the pinion M and insure release of the latter just immediately prior to the completion of the stroke of the piston, and thus permit of sudden partial rotation of the pinion, whereby to change the valve and reverse the stroke of said piston to maintain proper reciprocating movement thereof.

By examination of the drawings it will be seen that as the piston moves in either direction the rack $n^2$ is advanced toward and engages with the pinion M, and, owing to the sectoral notch $m$, the pinion rotates slightly without moving the valve until the pins $m'\ m^2$ have passed the central line, 1 2. At this moment the rack in its onward movement is disengaged from its pinion, and the springs, which may be spiral or of any form which will accomplish mechanically the same result, suddenly exert their tension, and the pinion M, mounted loosely upon the hub $k$, is rapidly thrown in partial rotation until one end of the sectoral notch $m$ strikes the pin $l$, when the momentum of said pinion instantly changes the position of the valve to alter and reverse the movement of the piston.

By the mechanism above described the valve has a sudden movement, and a positive impulse or blow is administered. Moreover, so quickly is the change effected that the flow of the water is not checked or the pressure diminished in consequence of such change. Neither is there a possibility of a dead center, as the valve must necessarily be in one of two extremes of position and held so by the springs—that is, it will be ready to admit liquid upon one of the two sides of the piston $a$. The movement of the piston $a$ is recorded upon a dial, $o$, by means of the pointer $p$, which is rotated by a toothed gear, O, actuated by and engaging with a bell-lever, P, the latter being maintained in contact with the head of the piston by the spring $q$.

To adjust the meter—that is, to make the movements of the piston $a$ or the travel of the pointer $p$ upon the dial agree with the quantity of liquid discharged by the apparatus in a unit of time—I have disposed a passage, $r$, in the bottom B of the shell A, and connect the supply-chamber F with the passage or duct $e$, which leads from the port $d'$ to the valve $g$ and measuring-chamber I. The mouth of this passage $r$ is protected by wire-cloth or a foraminated plate to prevent entrance of any foreign substance. Control of this passage is governed by a screw-valve, Q, and more or less water admitted thereby into the passage $e$ in addition to that delivered by the measuring-valve $c$, according as the dial registers more or less than the quantity delivered by the apparatus. Suppose, for example, that a cubic foot of water is discharged in a unit of time and the index-hand on the dial registers a trifle short. It is evident that the piston has not traveled quite fast enough, and it is then necessary since the ratio existing between the differential valves $b$ and $c$ is fixed relatively to each other, to slightly alter said ratio in another way; and this result is obtained by simply adjusting the valve Q to admit a small quantity of water from the supply-chamber to increase the amount delivered to the piston through the passage $e$, and thus the meter is easily adjusted. If the dial shows more, it is evident that the travel of the piston is too rapid, and this secondary supply must be accordingly checked.

The operation of this device is as follows: The valve being shown in a position to admit liquid to the upper side of the piston $a$, which has not quite completed its stroke, but when so completed will have actuated the pinion M and thrown the pins $m'$ $m^2$ past the center line, 1 2, by means of the rack $n^2$, the latter is now disengaged from the pinion M by the final movement of the piston, and the springs, by means of the pinion, which is then free to rotate, exert their tension upon the latter while the sectoral notch $m$ impinges against the pin $l$, and the valve is suddenly thrown in the opposite direction to that shown in the drawings. Now, supposing this last action has just been accomplished, the main supply is flowing continuously through the supply-chamber F and maintains the differential compound valve J open, and the main portion of said liquid passes freely into the discharge-chamber H, thence to the outlet-pipe to the house. But, as before premised, the valve J is a compound one; hence while the valve $l$ is maintained open the smaller or measuring valve, $c$, is likewise open, and a very much smaller amount of liquid—any proportional part of the quantity which is passing through the port $d$—is diverted from its course, and under the pressure from the street-main passes through the port $d'$ and duct $e$ into the inlet-port $h$ of the valve $g$ and port $j'$, the latter leading into the lower part of the measuring-chamber I. This flow of liquid at once starts the piston $a$ upon its return-stroke, the outlet-passages $i^2$ $h'$ being closed, and the liquid exhausting from the upper part of said chamber by and through the discharge-passage $j$, ports $h^2$ and $i'$ into $i$, and thence directly into the discharge-chamber H. The liquid through the measuring-pipe $e$ continues to flow into the chamber I, and gradually forces the piston upward, when the rack $n^2$ again engages the pinion and forces it against the tension of the springs $n$ $n'$ until their movable points of support, $m'$ $m^2$, have passed the center of the line 1 2 in the opposite direction from that previously explained, the valve $g$ remaining unchanged in its position until the movement of the piston upward, just before completing its stroke, has disengaged the rack from the pinion, and the latter is free to be actuated by its springs, and the valve is again shifted, when liquid from the measuring-valve is free to enter through the port $h$ in the valve by means of the passage $j$ to the upper part of the measuring-chamber, and the liquid which has just accomplished the movement of said piston is free to exhaust by and through the ports $j'$ $h'$ into the passages $i^2$ and $i$, and thence to the discharge-chamber, where it joins the stream of liquid passing to the house.

It will further be seen that the upward movement of the piston has actuated the lever P and advanced the toothed disk O, and with it the hand over the dial, a small amount.

I do not desire to be limited to the use of a piston reciprocating within the measuring-chamber, since I find a revolving wheel with buckets will answer the same purpose and effect the same result—viz., to actuate the index-pointer in conformity with the main quantity of liquid being delivered by the apparatus. In the present instance I have made the diameter of the piston large, in order to get an increase in its surface and greater resultant pressure from the liquid passing through the measuring valve and pipe.

From the above description and the operation of the various parts it will be seen that by means of the intermediary valve $g$, with its ports, the measuring-chamber is subjected to two different pressures, and while the liquid exhausting from said chamber upon one side is subjected only to the discharge-pressure, it is evident that the liquid entering therein has the full pressure from the supply-chamber direct from the street-main. Thus the back-pressure is entirely avoided and the discharge or flow of the smaller or measured portion of the liquid is not interfered with—a result which has hitherto never been accomplished. Moreover, this back-pressure has been a great obstacle, and one which has interfered with and rendered the action of differential-valve meters of this class very unreliable; hence the discharge of the measured liquid into the open air as a means of avoiding back-pressure.

Another and prominent feature in this invention is that the pressure through both the delivery-port $d$ and the measuring-port $d'$ is the same, since the pressure from the street-main is directed upon the supply-chamber from which they both lead; moreover, the resisting or back pressure are equal, since the main flow receives this back-pressure directly through the port $d$, while the measured liquid or smaller flow has it to overcome indirectly through the valve $g$ and piston $a$ in reality—one and the same pressure.

Now, in the patented meter before referred to, in which both the differential valves are located in the supply-chamber, the same objections exist as occur in the same class of meters in which one valve (the delivery) is in the supply-chamber, and the other (the measuring-valve) in the discharge-chamber, since in that patent the measuring-fluid passes to the open air, and the smaller valve is therefore subjected to a much greater pressure than the large or delivery valve, since the latter has its pressure reduced by the back-pressure in the discharge-chamber leading to the house.

It is evident, in order to render proportional meters reliable, that the same resultant pressure or pressures should always be exerted upon the two valves—the measuring and delivery—in order to maintain a certain fixed ratio, and in my invention I have endeavored to accomplish this result.

I claim—

1. In combination with a valve having two solid parts which reciprocate longitudinally together, a water-meter casing having two passages which are closed, respectively, by said parts of said valve, substantially as set forth.

2. In combination with a valve having two conical parts which reciprocate longitudinally together, a water-meter having two passages which are closed, respectively, by said parts of said valve, substantially as set forth.

3. In a liquid-meter, the outlet-passage, the passage which leads to the measuring-chamber, and a solid longitudinally-movable automatic differential valve which governs the latter passage, and also directs communication with the former, in combination with a passage which conducts the discharged liquid from said measuring-chamber to said outlet, in order that the back-pressure in the measuring device may be the same as the back-pressure of the main water-supply, substantially as set forth.

4. The compound differential valve J, having a larger conical part, $b$, which fits the seat $d$, and a smaller conical part, $c$, which fits the seat $d'$, in combination with the main outlet-passage supplied through the larger seat, the supplementary passage $e$, supplied through the smaller seat, the measuring-piston $a$, actuated by the liquid flowing through the latter passage, and an additional passage which conducts to the common outlet under pressure the liquid discharged by said piston, substantially as set forth.

5. In a liquid-meter, the combination of the supply-chamber, the measuring-chamber, and the discharge-chamber, with a passage leading from said supply-chamber to said measuring-chamber, a passage leading from said measuring-chamber to said discharge-chamber, and a solid longitudinally-movable automatic differential valve which governs the passage first named, and also governs the direct communication between the supply-chamber and discharge-chamber, substantially as set forth.

6. The automatic simultaneously-acting cones $b$ $c$ and their seats, in combination with the main outlet, which is governed by the first of said cones, the passage to the measuring-chamber, which is governed by the second of said cones, and the passage which conducts the discharge from the measuring-chamber to said outlet under the same back-pressure as that encountered by the main water-supply, substantially as set forth.

7. In combination with measuring-piston $a$ and the chamber in which it works, a passage leading from the supply-chamber to both sides of said piston, a passage allowing the outflow to the discharge-chamber of the liquid forced out by said piston, and a weighted differential valve which governs both the main opening connecting the supply-chamber and discharge-chamber, and the supply of liquid to said piston, for the purpose set forth.

8. In a liquid-meter, a longitudinally-movable solid differential valve, in combination with a measuring-chamber and its inlet and outlet passages, said valve governing both the direct communication with the outlet and the flow of water to said measuring-chamber, the liquid entering the measuring-chamber subject to the main pressure of supply and flowing out of the same subject to the discharge-pressure, substantially as set forth.

9. The oscillating valve $g$, having inlet-passage $h$ and outlet-passages $h'$ $h^2$, in combination with the inlet-passages $j$ $j'$, the outlet-passages $i$ $i'$, alternately communicating with said valve-passages, as described, the measuring-chamber I, supplied by and discharging through said passages, respectively, the piston $a$, reciprocating in said chamber, devices actuated by said piston for oscillating said valve, the pipe $e$, which supplies passage $h$, the pipe $i$, which conducts the discharge from chamber I to the outlet, and the differential valve which governs simultaneously the direct communication with the main outlet and the flow of liquid through passage $e$, substantially as set forth.

10. The combination of the lever P, spring $q$, and registering mechanism actuated thereby with the piston $a$, arranged to strike said lever at every upstroke, and the inlet and discharge passages, substantially as set forth.

11. The combination, with a differential valve which governs the direct communication with the outlet, and also the passage which supplies the measuring-chamber, of said passage-chamber and outlet, a passage connecting said chamber and outlet, and a supplemental passage and adjusting-screw for regulating independently of said valve the supply of the piston with relation to the main supply, substantially as set forth.

12. In a meter of the class hereinbefore premised, the combination, with the measuring-chamber I and its piston $a$, of the rack $n^2$, the piston-rod N, and springs $n$ $n'$, said rack operating alternately to disengage and engage with the pinion M and permit the latter to change the valve $g$ to reverse said piston, substantially as set forth.

13. The combination, with the rack $n^2$, operated by the piston $a$, of the pinion M, provided with the sectoral notch and loosely mounted upon the slotted hub $k$, the actuating-springs $n$ $n'$, and the valve $g$, whereby sudden impulse is imparted to the latter by the release of the pinion from said rack and the valve is intermittently changed, substantially as stated.

14. In meters of the class herein premised, the combination, with the automatic smaller or measuring valve, of a secondary adjusting-valve, Q, operated by hand, by which to increase or diminish the supply delivered by said measuring-valve, and thereby change the ratio or differentiality existing between the delivery and measuring valves, substantially as and for purposes set forth.

15. The automatic simultaneously-acting valves $b$ $c$ and their seats, in combination with the main outlet, which is governed by the first of said valves, and the passage to the measing-chamber, which is governed by the second of said valves, substantially as set forth.

In testimony whereof I affix my signature in presence of two witnesses.

LEVI WILLIAM LOMBARD.

Witnesses:
H. E. LODGE,
A. F. HAYDEN.